(12) United States Patent
Stark et al.

(10) Patent No.: US 8,906,140 B2
(45) Date of Patent: Dec. 9, 2014

(54) FILTRATION MODULE

(71) Applicant: W. L. Gore & Associates, Inc., Newark, DE (US)

(72) Inventors: Steve Stark, Wilmington, DE (US); Richard Gebert, Elkton, MD (US); John Knotts, Landenberg, PA (US); John Pasmore, Elkton, MD (US)

(73) Assignee: W.L. Gore & Associates, Inc., Newark, DE (US)

( * ) Notice: Subject to any disclaimer, the term of this patent is extended or adjusted under 35 U.S.C. 154(b) by 109 days.

(21) Appl. No.: 13/660,596

(22) Filed: Oct. 25, 2012

(65) Prior Publication Data

US 2013/0104736 A1 May 2, 2013

Related U.S. Application Data

(60) Provisional application No. 61/551,814, filed on Oct. 26, 2011.

(51) Int. Cl.
| | |
|---|---|
| *B01D 53/02* | (2006.01) |
| *B01D 53/64* | (2006.01) |
| *B01D 67/00* | (2006.01) |
| *B01D 53/04* | (2006.01) |
| *B01D 53/50* | (2006.01) |
| *B01D 53/73* | (2006.01) |
| *B01D 53/82* | (2006.01) |
| *F23J 15/02* | (2006.01) |

(52) U.S. Cl.
CPC ............. *B01D 53/64* (2013.01); *B01D 67/00* (2013.01); *B01D 53/0415* (2013.01); *B01D 53/508* (2013.01); *B01D 53/73* (2013.01); *B01D 53/82* (2013.01); *F23J 15/025* (2013.01); B01D 2253/34 (2013.01); B01D 2253/102 (2013.01); B01D 2253/202 (2013.01); B01D 2257/602 (2013.01); B01D 2258/0283 (2013.01)
USPC ........ 95/134; 95/90; 55/372; 55/484; 29/428; 96/108

(58) Field of Classification Search
CPC .... B01D 53/64; B01D 53/02; B01D 53/0407; B01D 53/0415; B01D 53/73; B01D 53/82; B01D 53/508; B01D 67/00; B01D 2253/34; B01D 2253/102; B01D 2253/202; B01D 2257/602; B01D 2258/0283; F23J 15/00
USPC ................... 95/90, 134; 55/372, 484; 29/428; 96/108
See application file for complete search history.

(56) References Cited

U.S. PATENT DOCUMENTS

| | | |
|---|---|---|
| 3,037,637 A | 6/1962 | Bub |
| 3,076,554 A | 2/1963 | Bub |

(Continued)

FOREIGN PATENT DOCUMENTS

| | | |
|---|---|---|
| CA | 2036746 | 2/1992 |
| CA | 2419784 A1 | 3/2002 |

(Continued)

OTHER PUBLICATIONS

International Search Report for PCT/US2012/061924 dated Jun. 18, 2013.

*Primary Examiner* — Christopher P Jones
(74) *Attorney, Agent, or Firm* — Amy L. Miller

(57) ABSTRACT

A filtration module is provided that includes a filter member and a spacing member disposed in detached, contact engagement along a length of each member, such length extending about a longitudinal axis of a filtration module to define a concentric and detached plurality of filtration layers, and an interleaved, concentric and detached plurality of spacing layers, respectively. One or both of the plurality of spacing layers and plurality of filtration layers may provide a radially-inward directed force. The spacing member may be elastically deformed in the filtration module to apply a radially-inward directed force and a radially-outward directed force, wherein the filtration and spacing layers are retained in substantial fixed spatial relation. A retaining member may be located to engage an external side surface of the filtration module. A filtration module may be constructed by winding the filter member and spacing member about a longitudinal axis of the module.

39 Claims, 12 Drawing Sheets

(56) References Cited

U.S. PATENT DOCUMENTS

| | | | |
|---|---|---|---|
| 5,188,644 A * | 2/1993 | Landy | 95/268 |
| 6,432,179 B1 | 8/2002 | Lobovsky et al. | |
| 6,716,274 B2 | 4/2004 | Gogins et al. | |
| 7,442,352 B2 | 10/2008 | Lu et al. | |
| 2004/0198115 A1 | 10/2004 | McGregor et al. | |
| 2005/0223894 A1 * | 10/2005 | Sohnemann | 95/143 |
| 2007/0207336 A1 | 9/2007 | Bruck et al. | |
| 2009/0294348 A1 | 12/2009 | Krogue et al. | |
| 2010/0065030 A1 | 3/2010 | Bellis | |
| 2010/0095843 A1 * | 4/2010 | Gebert et al. | 95/134 |

FOREIGN PATENT DOCUMENTS

| | | |
|---|---|---|
| EP | 0168127 A2 | 1/1986 |
| EP | 1 586 364 | 10/2005 |
| GB | 959042 | 5/1964 |
| GB | 1 452 982 | 10/1976 |
| WO | WO 87/01301 | 3/1987 |
| WO | 02079633 A1 | 10/2002 |
| WO | WO 2012/051524 | 4/2012 |

* cited by examiner

FILTRATION MODULE

RELATED APPLICATIONS

The present application is a regular application based on co-pending U.S. Provisional Patent Application 61/551,814 filed Oct. 26, 2011.

FIELD OF THE INVENTION

The present invention relates to filters for removal of undesired constituents of a gas stream, and is particularly apt for use in the removal of environmental pollutants from flue gases.

BACKGROUND OF THE INVENTION

Filters are used in a wide variety of applications where it is desired to separate particles or other substances from a fluid stream (e.g., a stream of gas). Applications of filters include removing dust and other particulates in residential or commercial ventilation systems. Applications further include removing substances from flue gases such as those from cement kilns, coal and oil fired power generation plants, industrial boilers, municipal waste incinerators, and oil refinery plants. Such flue gases may contain substantial varieties and quantities of environmental pollutants, such as sulfur oxides ($SO_2$ and $SO_3$), nitrogen oxides (NO and $NO_2$), mercury (Hg) vapor, and particulate matters (PM). In the United States, burning coal alone generates about 27 million tons of $SO_2$ and 45 tons of Hg each year.

The destructive effects of various pollutants on human health and on the ecosystem have long been recognized. For example, SOx and NOx have been linked to the outbreak of respiratory diseases in affected areas. They also form acid rain, which damages forests, fisheries, and architectures. As for Hg, it is a potent toxin to the nervous system. Exposure to mercury can affect the brain, spinal cord, and other vital organs. It is particularly dangerous to developing fetuses and young children.

Enacted and proposed environmental regulations require significant reductions in mercury emissions in a short time frame. These regulations extend to different industries; presenting challenges in various types of facilities (e.g., cement kilns).

In U.S. Pat. No. 7,442,352, which is incorporated herein by reference in its entirety, a process is described for reducing multiple pollutants (e.g., sulfur oxides, mercury vapor, and fine particulate matters). In that process, pollutants are removed by modules, which contain a microporous adsorbent material (i.e., sorbent) held within a polymer matrix. The mercury vapor is removed from flue gas by chemically adsorbing Hg vapors (e.g., either elemental mercury or oxidized mercury) into the polymer matrix. A sorbent house is described in U.S. Pat. No. 7,442,352 that comprises a plurality of sorbent modules, each comprised of a solid frame and a plurality of sheets held in place by the solid frame.

SUMMARY OF THE INVENTION

An object of embodiments described herein is to provide a filtration module and assembly with an improved structure and reduced manufacturing costs. In this regard, manufacturing cycle times, parts costs and production costs may be reduced while filter performance is maintained or improved. Moreover, embodiments described herein provide a method of manufacturing an improved filtration module and assembly, that is operable to produce a wide variety of module shapes, thereby efficiently accommodating a wide variety of application geometries.

In one aspect, a filtration module is provided that comprises a filter member and a spacing member, the filter member and the spacing member being disposed in detached, contact engagement along a length of each of the members to define a predetermined configuration of the filtration module. The length of the filter member and the length of the spacing member may each extend about a longitudinal axis of the filtration module so as to define a concentric and detached plurality of filtration layers, and an interleaved, concentric and detached plurality of spacing layers, respectively.

In various embodiments, the spacing layers and/or filtration layers may be provided to apply a radially-inward directed force. In one approach, the filter member and spacing member may be wound, with a tensile force applied to the spacing member and/or filter member, to define the plurality of filtration layers and the plurality of spacing layers. As may be appreciated, the provision of a radially-inward directed force may facilitate retentive positioning of the filtration and spacing layers, free from physical interconnection components (e.g., edge clips, adhesives, etc.) that connect different ones of said layers along their respective lengths.

In some implementations, the spacing member may be elastically deformable. In turn, at least a portion of the spacing member may be elastically deformed in the filtration module. For example, the spacing member may be elastically deformed between adjacent ones of the plurality of filtration layers, along at least a portion of the length of the spacing member. In this regard, elastically deformed spacing layers may apply a radially-inward directed force and a radially-outward directed force to different adjacent ones of the filtration layers. For such purposes, the spacing member may be preformed to have a non-deformed, preassembly configuration, wherein the spacing member may be elastically deformed to a different, assembled configuration in the filtration module to apply the radially-inward directed and radially-outward directed forces.

In certain embodiments, the spacing member may be preformed to have an undulating configuration comprising a plurality of undulations extending across a width thereof along the length thereof. For example, the spacing member may be pleated to define a plurality of pleats extending across the spacing member. In this regard, each of the pleats may be disposed to extend in a direction coincidental (e.g., parallel) to the longitudinal axis of the filtration module. As such, the plurality of pleats may define a plurality of open channels that extend in a direction coincidental with the longitudinal axis from a first end of the filtration module to a second end of the filtration module. In turn, the open channels may facilitate gas flow through the filtration module with a relatively low pressure drop, while facilitating contact of the gas with the filter member.

In one approach, a spacing member may be provided with commonly-configured undulations, wherein corresponding portions (e.g., aligned portions) of all or some of the undulations are configured across a portion of the width of the spacing member (e.g., between opposite edges of the spacing member) to define notched, or recessed, surface portions. The notched portions may be sized to receive at least a portion of the filter member therein. In turn, upon assembly of a filtration module, the notched portions of the spacing member may define a channel or channel portions along the plurality of spacing layers, wherein at least portions of adjacent filtration layers may be located therewithin. As may be appreciated, the provision of notched portions in the spacing member may facilitate the maintenance of the desired relative positioning of the filtration and spacing layers.

In some implementations, a pleated spacing member may comprise a series of permanent folds of equal height in alternating opposite directions to define an accordion-shaped configuration. In this regard, an interconnected series of V-shaped portions may comprise a pleated spacer member, wherein at least some of the series of V-shaped portions are elastically deformed from a preassembly height and width (e.g., in a non-deformed state) to an assembled height and assembled width (e.g., in a deformed state), wherein the assembled height is less than the preassembly height and the assembled width is greater than the preassembly width. As may be appreciated, the assembled height establishes the spacing between adjacent filtration layer portions.

To facilitate gas flow contact with the filter member, the spacing member may comprise openings therethrough. For example, openings may be provided along the length and across a width of the spacing member, wherein gas flowing between adjacent ones of the filtration layers may pass through and along the spacing member to contact each of the opposing surfaces of such filtration layers. In one approach, the spacing member may comprise a screen. For example, the screen may be defined by filaments arranged in a crisscross pattern.

In some implementations, a retaining member may be provided to maintain the plurality of filtration layers and the plurality of spacing layers in substantially fixed spatial relation to one another. The retaining member may be removably located to restrainably engage an external side surface portion of the filtration module (e.g., in spaced-relation to both ends of filtration module). In turn, desired gas flow through the filtration module may be maintained, and removal of retaining member may be readily affected to facilitate disassembly, servicing and reassembly of components.

In one approach, a retaining member may be attached to an exposed side, or outer side, surface portion of an outer layer of one of the filter member or spacer member and to an exposed outer surface portion of another layer of the same said one of the filter member and spacing member. As may be appreciated, such attachment of the attached retention member may function to maintain the filtration layers and spacing layers in contact engagement by restricting the layers from unwinding. In another approach, a retaining member may be provided about the entirety of an outer exposed surface of the filtration module to restrain the filtration layers and spacing layers from relative movement. For example, a band-like retaining member may be provided about the filtration module. Alternatively and/or additionally, a holder may be provided in a filtration assembly to function as a retaining member, as will be further described hereinbelow.

In embodiments particularly adapted for flue gas applications, the spacing member may be provided to have a melting temperature of at least about 60° C. or higher. Further, the spacing member may be provided to exhibit resistance to sulfuric acid and hydrochloric acid (e.g., resistance to structural degradation due to exposure to sulfuric acid and hydrochloric acid).

In certain applications, the spacing member may comprise a material selected from a group comprising: polytetrafluoroethylene (PTFE); polyfluoroethylene propylene (FEP); polyperfluoroacrylate (PFA); polyvinylidene fluoride (PVDF); polyether ether ketone (PEEK); polyvinyl chloride (PVC); chlorinated polyvinyl chloride (CPVC); and polypropylene (PP). In conjunction with such applications, the filter member may comprise a material selected from a group comprising: PTFE; FEP; PFA; PVDF; a terpolymer of tetrafluoroethylene, hexafluoropropylene and vinylidene fluoride (THV); polychloro trifluoro ethylene (PCFE); and other materials comprising fluoropolymers, and copolymers or terpolymers of fluoromonomer/non-fluorinated monomers.

In another aspect, a filter member and a spacing member may be disposed to define corresponding concentric filtration layers and interleaved, concentric spacing layers, wherein a filtration module having a predetermined configuration may be provided (e.g., a peripheral geometric solid configuration). In various embodiments, the outer predetermined configuration may be cylindrical or prismatic.

In some embodiments, the spacing member and filter member may be of substantially equal widths. In turn, exposed edges of the filtration layers and spacing layers at each end of the filtration module may be disposed to lie in substantially common planes.

In yet another aspect, a filter assembly may be provided that includes a filtration module having one or more of the features noted herein, and further includes a holder for supporting the filtration module. In this regard, the holder may be adapted for ready positioning within and removal from a gas passageway (e.g., a flue gas port). In the latter regard, a holder may be provided having a configuration that coincides with the internal configuration of a gas flow exhaust port. In one approach, a tray-like holder may be provided that may be laterally advanced/retracted on side-edge supports of a frame located about a gas passageway, thereby facilitating operational placement and servicing removal of a filtration module supported by the holder. In such arrangements, a plurality of filtration assemblies may be selectively positioned in series along the gas passageway (e.g., in aligned or stacked relation), wherein the holder/filtration module of each assembly is separately supported by and advanceable/retractable relation to different side edge supports of a frame.

In various embodiments, a holder may be provided having a ring portion defining an annular opening for receiving a filtration module therein. In this regard, the ring portion may be of a configuration or shape that coincides with and is slightly larger than, the outer configuration of the filtration module. In one implementation, the ring portion may function as a retaining member to restrain the filtration layers and spacing layers from relative movement In one approach, a support member may be provided across a bottom of the opening of the holder to support the filtration module. In another approach, a net-like carrier may be provided for selectively receiving a filtration module therein. In turn, the carrier may be selectively positionable within the opening defined by the ring portion of the holder, wherein the carrier may be supportably interconnectable to the holder and suspended within the opening, e.g., via the inclusion of a ring that is selectively positionable over and about the ring portion of the holder.

A method of constructing a filtration module is also provided. The method may include the steps of providing a filter member and a spacing member, and positioning lengths of each of the filter member and spacing member about a longitudinal axis to define a concentric, detached plurality of filtration layers and an interleaved, concentric and detached plurality of spacing layers, respectively, wherein the filter member and the spacing member are disposed in detached, contact engagement along said length of each of the members. The method may further include the step of maintaining the plurality of filtration layers and the plurality of spacing layers in substantially fixed spatial relation to one another.

In one aspect, the method may further comprise a step of tensioning the spacing member and/or filter member during at least a portion of the positioning step. In one application, the method may include applying a force to maintain a tension on the spacing member throughout, or during at least a portion of, the positioning step.

The spacing member may be elastically deformable, wherein the method may further include elastically deforming at least a portion of the spacing member in response to the tension application step. Correspondingly, at least a portion of the elastic deformation may be maintained (e.g., post construction), thereby yielding radially-inward and radially-outward directed forces in the filtration module.

Optionally, the spacing member may be preformed to have an undulating configuration comprising a plurality of undulations extending across a width thereof along the length thereof. For example, the spacing member may be pleated to define a plurality of pleats extending across the width of the spacing member along the length thereof. The spacing member may be provided so that corresponding portions (e.g., aligned portions) of all or some of the undulations are configured across a portion of the width of the spacing member (e.g., between opposite edges of the spacing member) to define notched, or recessed, surface portions. The notched portions may be sized to receive at least a portion of the filter member therein. In turn, the method may include locating at least a portion of an adjacent filtration layer within the notched portions during the positioning step.

In one embodiment, the filter member and the spacing member may be positioned by wrapping the filter member and the spacing member in tandem about the longitudinal axis. For example, such wrapping may include interconnecting first, or inner, ends of the filter member and the spacing member to a post member, and rotating the post member to wind the filter member and the spacing member about the post member. As may be appreciated, the post member may be selectively removed from the filtration module after the rotating step.

In conjunction with the above-referenced wrapping approach, the spacing member and/or filter member may be tensioned during rotation of the post member. For example, a force may be applied at an end of the spacing member and/or filter member during winding and/or a force may be applied to a side of the spacing member or filter member during winding. With the wrapping approach, the method may also optionally include locating the filter member within optional, notched portions of the spacing member during winding.

When an elastically deformable spacing member is employed, the application of force to maintain tension on the spacing member and/or the filter member during rotation of the post member yields elastic deformation of the spacing member. For example, when an elastically-deformable pleated spacing member is employed, tension applied thereto during winding may yield elastic deformation as described above. In turn, the spacing member may provide radially-inward and radially-outward directed forces upon construction of the filtration module.

In some embodiments, the maintaining step may comprise retaining outer ends of the filter member and spacing member at corresponding, substantially fixed distances from the longitudinal axis. In one approach, such retention may be realized by attaching a retaining member to an exposed surface portion of a layer of one of the filter member and spacing member, and to an exposed surface portion of another layer of said one of the filter member and spacing member. Other approaches may entail retainably locating a retaining member about the side periphery of the constructed filtration module.

The various features, arrangements and embodiments discussed above in relation to each aforementioned aspect may be utilized by any of the aforementioned aspects. Additional aspects and corresponding advantages will be apparent to those skilled in the art upon consideration of the further description that follows.

DETAILED DESCRIPTION

Figure 1:
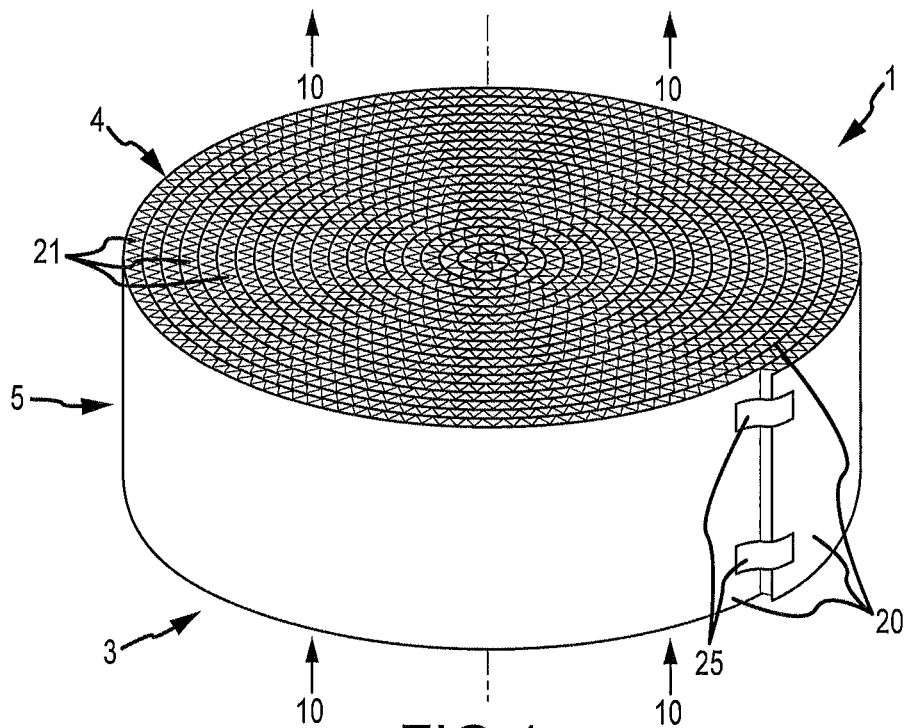
FIG. 1 is an isometric view of a filtration module.
Figure 2:
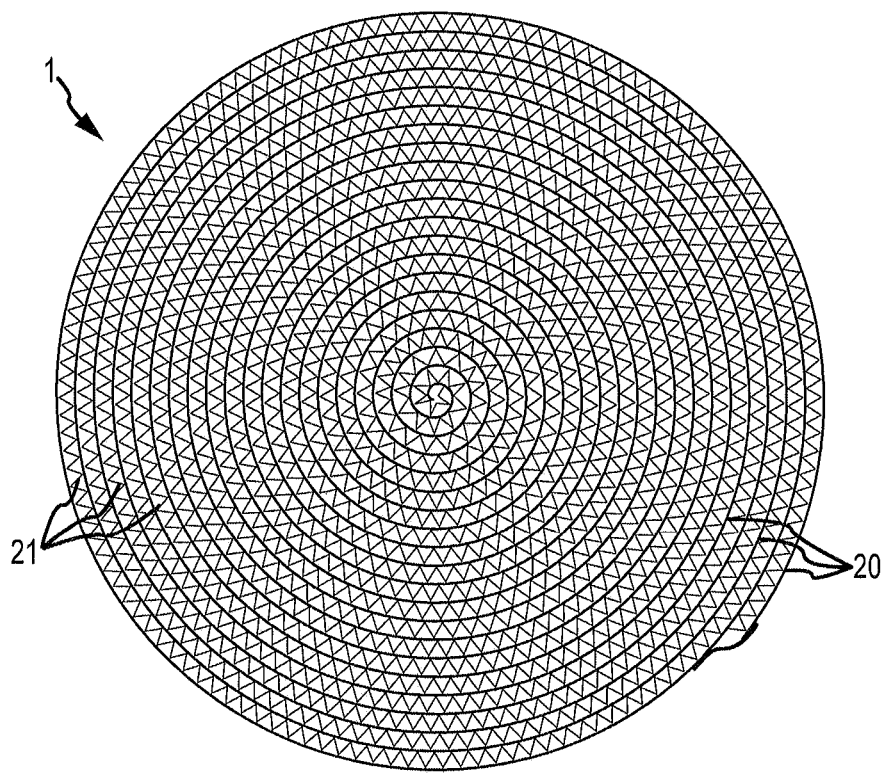
FIG. 2 is a plan view of the filtration module of FIG. 1.

FIG. 1 is an isometric view of a filtration module 1, and FIG. 2 is a plan view of the filtration module 1 shown in FIG. 1. In the illustrated embodiment, the filtration module 1 is in the geometric form of a cylinder that includes a first circular base 3 facing downward, a second circular base 4 facing upward, and an annular outer surface 5. Gas flow through the filtration module 1 may pass through the first circular base 3, into the interior of the filtration module 1, and out of filtration module 1 through the second circular base 4, e.g., in the direction of arrow 10.

The filtration module 1 may comprise a concentric plurality of filtration layers defined by a filter member 20, and an interleaved, concentric plurality of spacing layers defined by a spacing member 21. In this regard, filter member 20 and spacing member 21 may be disposed in contact engagement.

In one approach, the filter member 20 may comprise a filter tape (e.g., a continuous length or a plurality of lengths interconnected in end-to-end relation). Similarly, the spacing member 21 may comprise a spacing tape (e.g., a continuous length or a plurality of lengths interconnected in end-to-end relation). As illustrated, the filter tape 20 and spacing tape 21 may spiral outward and away from a longitudinal axis 13 of the filtration module 1.

The filter tape 20 may comprise materials appropriate for removal of selected undesirable constituents of gas flow through the filtration module 1. In relation to certain applications (e.g., flue gas filtration), examples of materials that may comprise filter tape 20 will be described hereinbelow.

Spacing tape 21 may be provided to maintain a gap or channels between adjacent layers of the filter tape 20 to facilitate the flow of a gas between adjacent layers of the filter tape 20, with good exposure to the filter tape 20 (e.g., for removal of undesired constituents). In this regard, spacing tape 20 may be constructed to facilitate the maintenance of gas flow channels and with acceptable pressure drop access filtration module 1.

Figure 3:
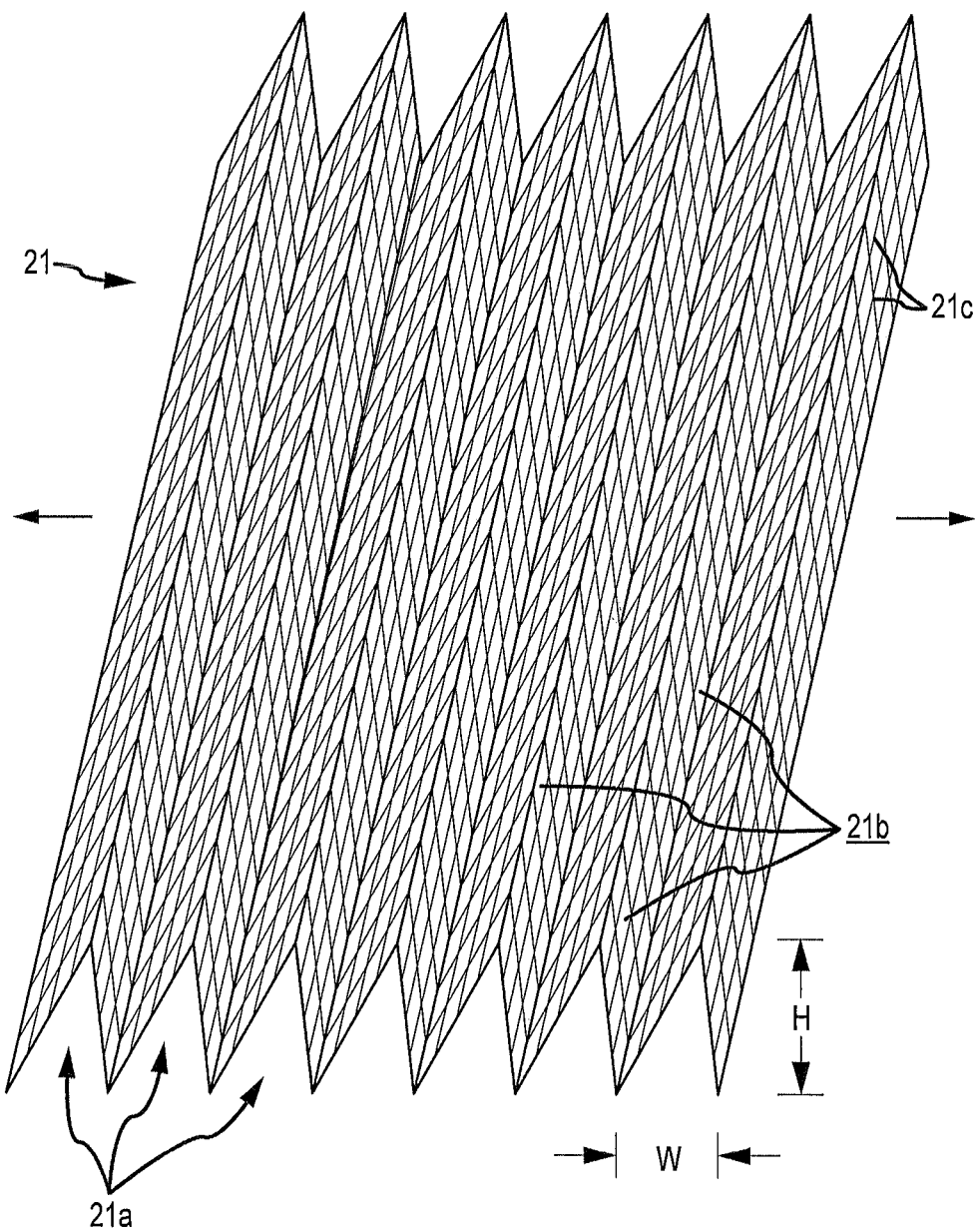
FIG. 3 is a perspective view of a segment of a spacing member employable in the filtration module of FIG. 1.

FIG. 3 illustrates a segment of a spacing tape 20 that may be utilized. The spacing tape 21 may be of a non-planar configuration, including for example, an undulating configuration. In one approach, the spacing tape 21 may be pleated to provide a series of V-shaped folds/portions 21a of common dimensions, thereby defining an accordion-shaped configuration.

To facilitate the maintenance of a gap, or channels, between adjacent layers of the filter tape 20, spacing tape 21 may be elastically deformable, wherein at least a portion of the spacing tape 21 is elastically deformed between adjacent layers of the filter tape 20 so as to provide a spring-back force that acts to maintain the openness of such channels. In this regard, spacing tape 21 may be provided with preformed undulations (e.g., pleats) that may be elastically deformed.

By way of example, V-shaped pleats 21a may be provided having a non-deformed width W and non-deformed height H prior to assembly in filtration module 1. Upon assembly, the spacing tape 21 may be provided so that V-shaped pleats 21a may be elastically deformed to a width that is greater than W and to a height that is less than H. As such, the spacing tape 21 may apply a radially-inward directed force (e.g., towards longitudinal axis 13) and a radially-outward directed force (e.g., away from longitudinal axis 13).

To further facilitate gas contact with filter tape 20, the spacing tape 21 may be provided with openings 21b, i.e., to facilitate the passage of gas therethrough. In turn, gas may flow between, and in contact with, opposing sides of adjacent ones of the filtration layers. In one approach, the spacing tape 21 may be provided in the form of a mesh, or screen, comprising filaments 21c arranged in a cross-hatched manner.

Spacing member may comprise materials and additional features apt for various applications. In that regard, specific embodiments employable as a spacing member 21 are described hereinbelow.

Figure 4:
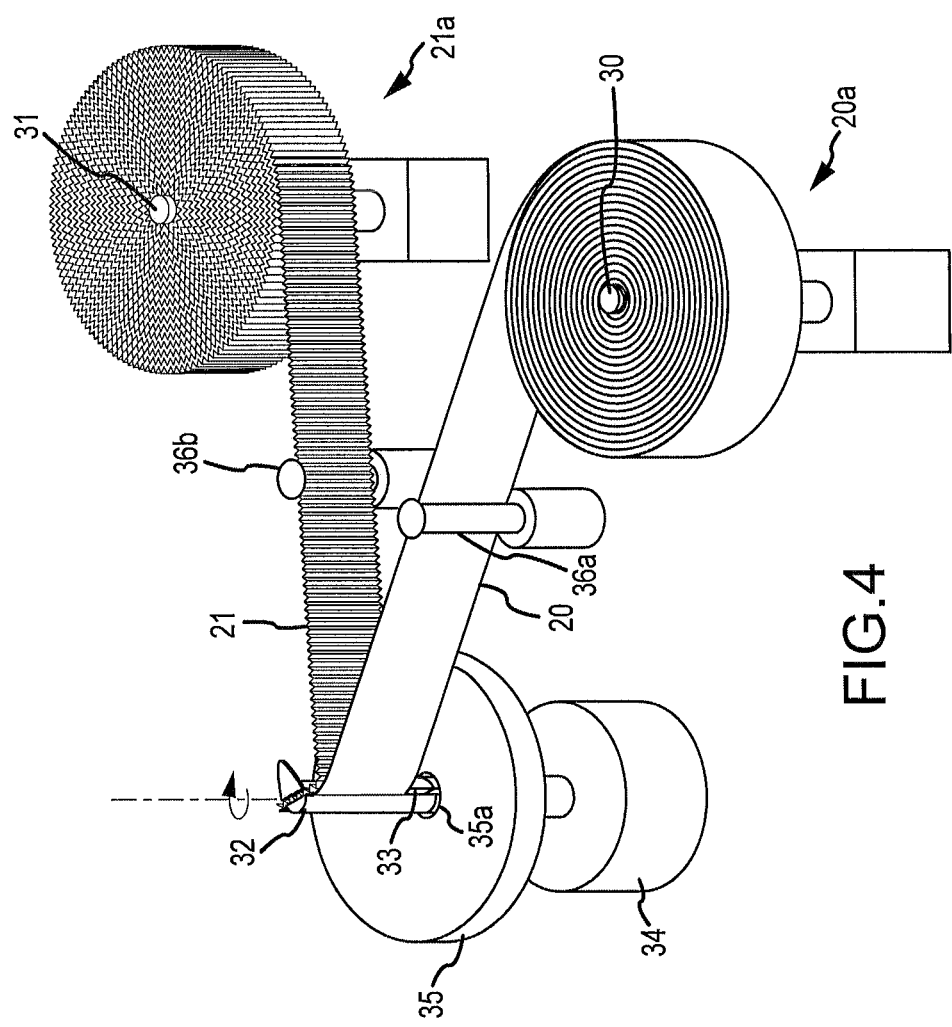
FIG. 4 is a diagram of an embodiment for construction of a filtration module.

Reference is now made to FIG. 4 which illustrates an embodiment for constructing a filtration module. For example, the illustrated embodiment may be employed for constructing the embodiment of filtration module 1 described hereinabove, and for purposes of description an exemplary filter construction process will be described in that context.

As illustrated in FIG. 4, a source roll 20A of a filter member 20 (e.g., a filter tape) may be provided on a first rotatable feed spool 30, and a source roll 21A of a spacing member 21 (e.g., a spacing tape) may be provided on a second rotatable feed spool 31. Free ends of the filter member 20 and spacing member 21 may be anchored through a slot 33 of a rod member 32. In turn, the rod member 32 may be rotated so as to wind the filter member 20 and spacing member 21 into a cylindrical configuration as described in relation to filtration module 1 hereinabove. In one approach, rod member 32 may be interconnected with a drive 34 to facilitate automated winding. In other approaches, rod member 32 may be manually rotated.

To facilitate aligned, edge-to-edge winding of the filter member 20 and spacing member 21 various alignment components may be utilized. For example, a plate member 35 may be provided, wherein rod member 32 extend through or rotates within an aperture 35a extending through the plate member 35. Additionally, alignment members 36a, 36b may be provided to supportably align the filter member 20 and spacing member 21, respectively, as shown in FIG. 4.

As a further option, tension may be applied to filter member 20 and/or to the spacing member 21 during winding. In one approach, rotatable first feed spool 30 may be provided to apply an axial force to filter member 20 and/or rotatable second feed spool 31 may be provided to apply an axial force to spacing member 21. In another approach, alignment member 36b may be provided to apply a lateral force against the spacing member 21 as the spacing member 21 passes by the alignment member 36b. Additionally and/or alternatively, alignment member 36a may be provided to apply a lateral force against the filter member 20 as the filter member 20 passes by the alignment member 36a.

Figure 15A:
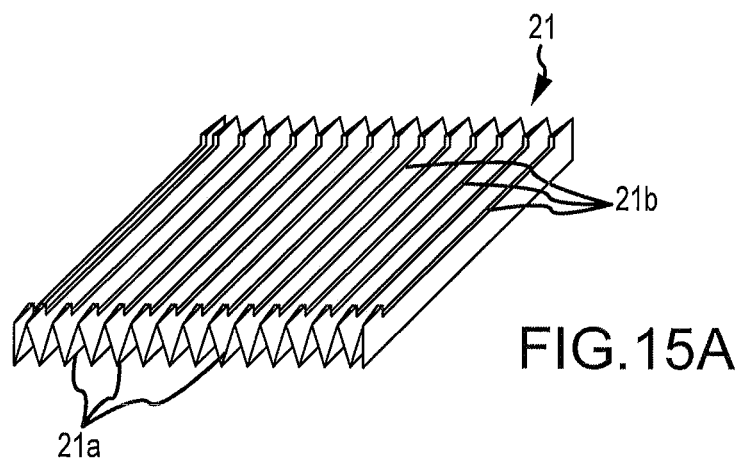
FIG. 15A illustrates a portion of an embodiment of a notched spacing member.
Figure 15B:
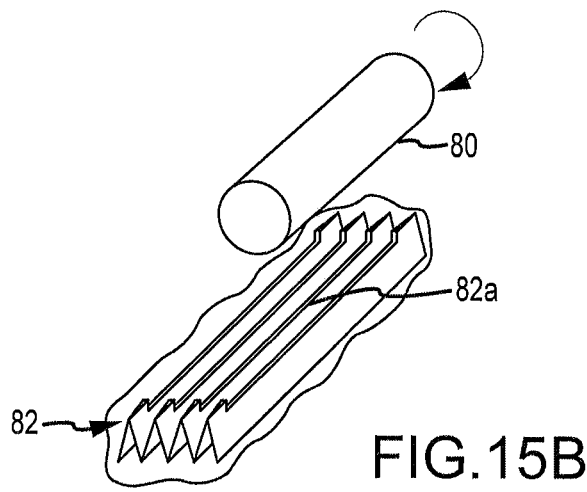
FIG. 15B illustrates an embodiment for use in producing the notched spacing member embodiment of FIG. 15A.
Figure 15C:
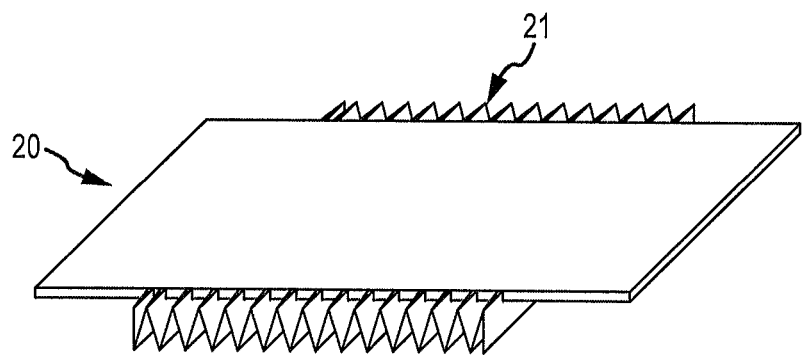
FIG. 15C illustrates a portion of a filter member embodiment located for assembly relative to the spacing member embodiment of FIG. 15A.

As another option, and with reference now to FIGS. 15A, 15B, and 15C, spacing member 21 may be provided with notched, or recessed, portions to receive at least a portion of a filter member 20. More particularly, V-shaped pleats 21a may be provided with notched portions 21b as shown in FIG. 15A.

Various approaches may be utilized to define the optional notched portions 21b of the spacing member 21. By way of example, a heated roll member 80 and opposing support member 82 may be utilized, as shown in FIG. 15B. As shown in FIG. 15B, the support member 82 may comprise a configured surface 82a shaped to receive the spacing member 21 and define notches 21b upon rolling contact by heated roll member 80. For example, the heated roll member 80 may flatten surface portions of the V-shaped pleats 21a between opposing edges of the spacing member 21. The support member 82 with configured surface 82a may be provided via metal fins on a stationary plate or by surface portions of a rotating gear member.

As noted, the optional notched portions 21b of spacing member 21 may be sized to receive at least a portion of filter member 20 therewithin, as shown in FIG. 15C. For such purposes, the width of spacing member 21 may be greater than the width of the filter member 20.

As may be appreciated, the embodiment illustrated in FIG. 4 may be readily employed for constructing a filter module utilizing an optional notched spacing member 21. That is, the notched spacing member 21 may be provided in a source roll 21a and positioned to receive filter member 21 within the notched portions 21b during the winding operation described above. The provision of notched portions 21b may advantageously facilitate the maintenance of desired relative positioning of the filter member and the spacing member.

After winding of filter member 20 and spacing member 21, the filtration module 1 may be removed from rod member 32 via relative movement of a filtration module 1 and rod member 32 along an axis corresponding with the longitudinal axis of the filtration module. To retain the cylindrical configuration of filtration module 1, a retaining member may be utilized. In one approach, adhesive strips 25 may be connected to outer, exposed side surface portions of filter member 20, as shown in FIG. 1.

After construction of filtration module 1, filtration module may be included in filtration assemblies that allow for easy insertion into and removal from flue gas streams. In this regard, filtration assemblies may be provided that facilitate ready removal of filtration module 1 from a flue gas stream for disassembly, cleaning, reassembly and reinsertion into a flue gas stream.

Figure 5:
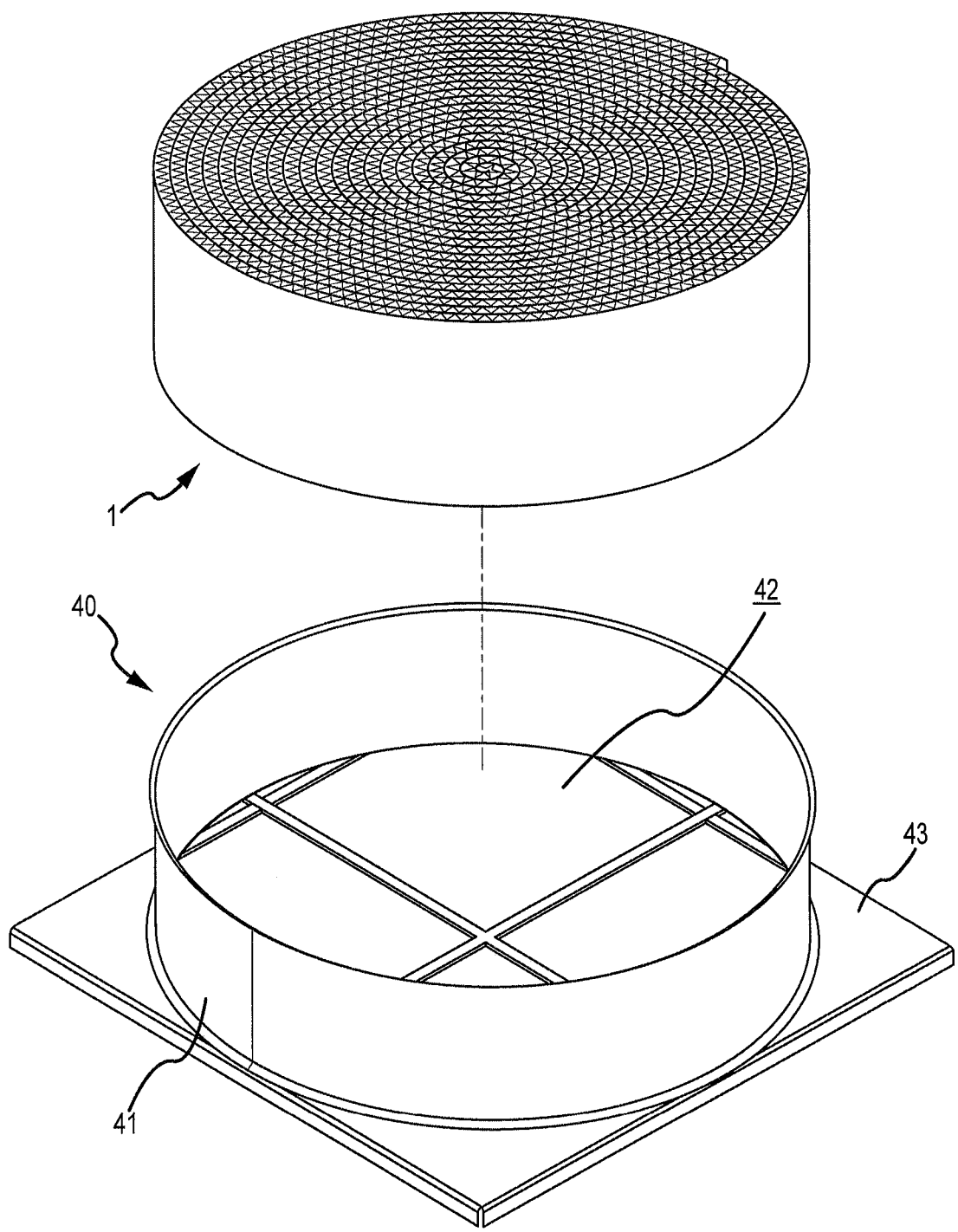
FIG. 5 is a perspective, assembly view of a filtration assembly.

In one approach, a filtration assembly may be employed as illustrated in FIG. 5. In the illustrated approach, a holder 40 may be provided for supporting a filtration module 1. In this regard, the filter holder 40 may be configured for conformal receipt of the filtration module 1 within an opening, wherein gas passage may be limited to passage through the filtration module 1. In FIG. 5, holder is configured to receive a cylindrical filtration module 1. Filter holder 40 may also be configured to receive other configurations.

In the embodiment shown in FIG. 5, holder 40 comprises a ring portion 41 to receive filtration module 1 within an opening 42 thereof. The ring portion 41 may be interconnected to a base member 43. Base member 43 may be of configuration that coincides with the configuration of a gas passageway into which the holder 40 may be positioned. As shown, cross bars 44 may be provided to support a filtration module 1 located within holder 40.

Figure 6:
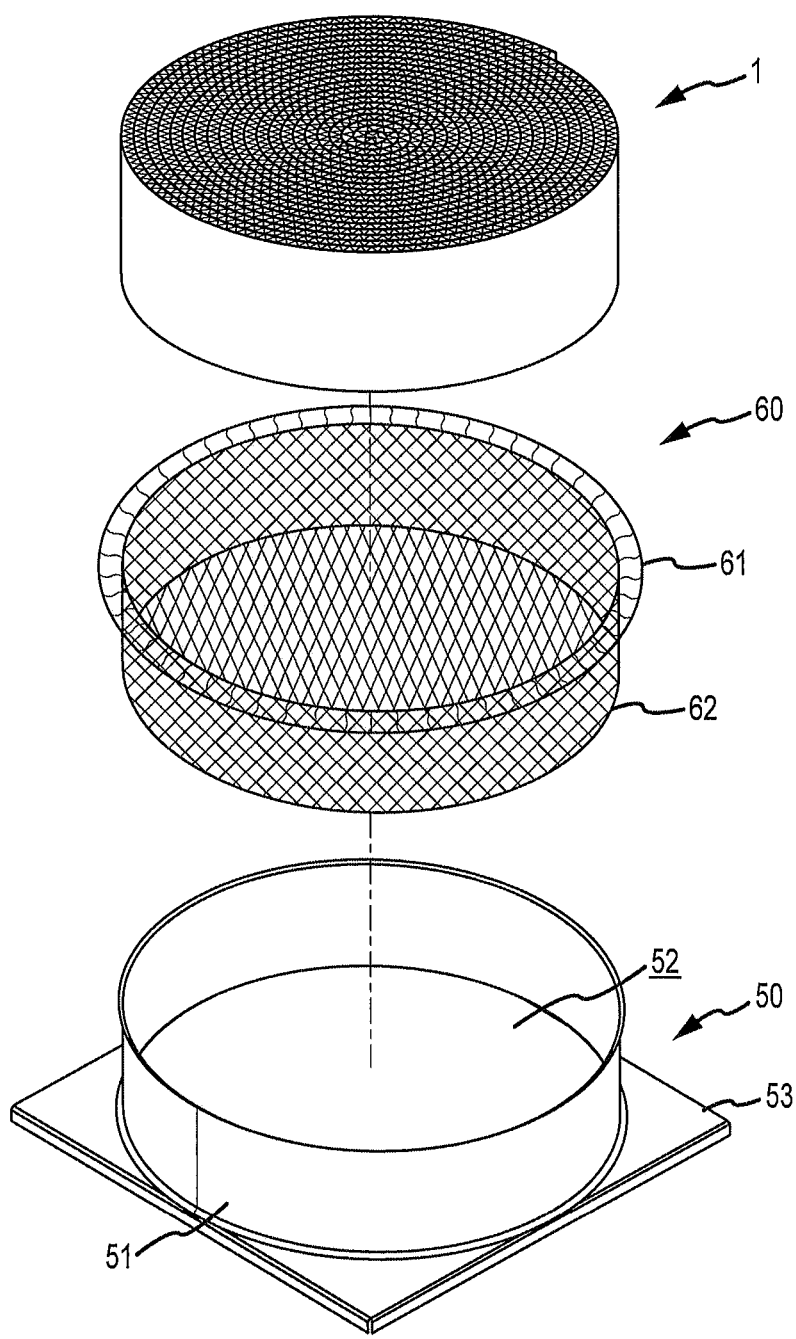
FIG. 6 is a perspective, assembly view of another filtration assembly.

FIG. 6 illustrates another embodiment of a holder 50. In this embodiment, an open cell carrier 60 is provided to receive the filtration module 1 therewithin. The open cell carrier 60 may comprise an enlarged ring member 61 and interconnected bag member 62. The bag member 62 may be of net-like construction, wherein gas passage through bag member 62 is substantially unobstructed. As shown, the holder 50 comprises a ring portion 51 sized to conformally receive the bag member 62 and filtration module 1 within an opening 52 thereof. The ring portion is connected to a base member 53. The ring member 61 may be sized for supportive positioning over and around the ring portion 51, wherein the bag member 62 and filtration module 1 may be suspended in opening 52.

In relation to the filtration assembly embodiment shown in FIGS. 5 and 6, frame structures may be utilized in gas passageways for support purposes. That is, frame structures having side-edge supports for slidably receiving a holder 40 and 50 may be provided. Such frame structures may be provided to support a plurality of holders 40 and/or 50 in aligned relation (e.g., vertically aligned relation) within a gas passageway.

Figure 7:
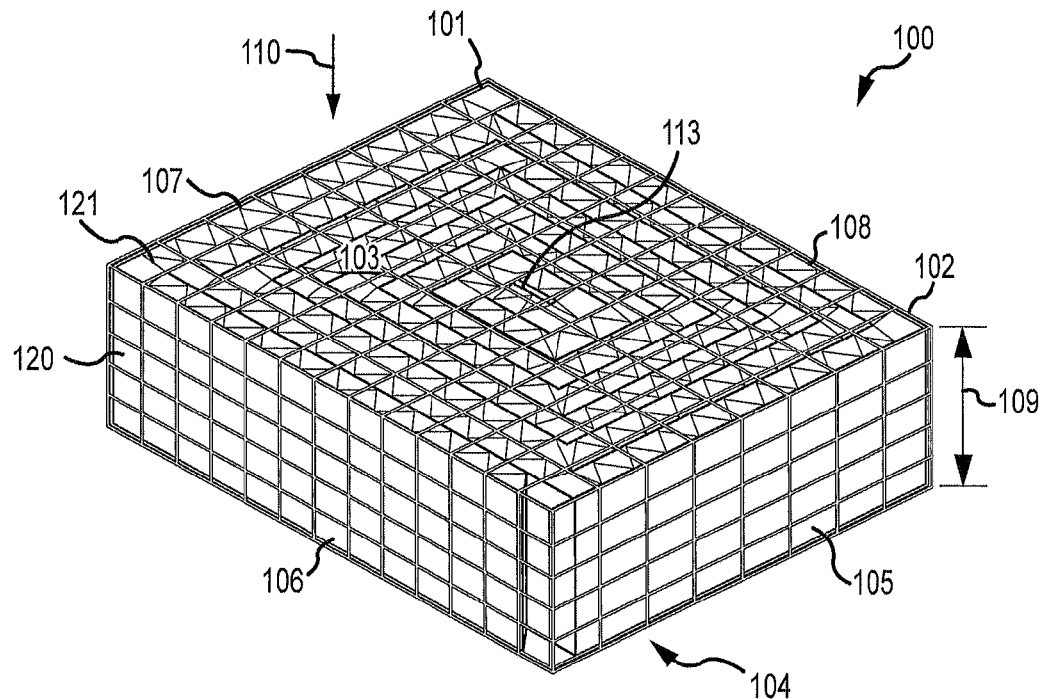
FIG. 7 is an isometric view of another filtration assembly.
Figure 8:
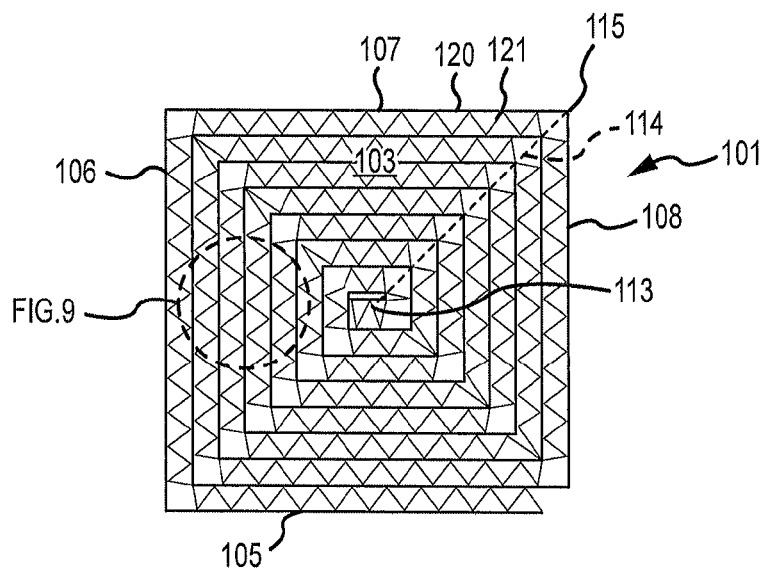
FIG. 8 is an illustration of a filtration module of the filtration assembly of FIG. 7.

FIG. 7 is an isometric view of another filtration assembly 100. The filtration assembly 100 may include a filtration module 101 disposed within a supporting structure 102. FIG. 8 is a plan view of the filtration module 101. The filtration module 101 may be in the form of a prism. A prism is a polyhedron made of an n-sided (where n is an integer greater than 2) polygonal base, a translated copy of the base, and n faces joining corresponding sides. Thus, the faces are parallelograms and all cross sections parallel to the base faces are the same. In this regard the filtration module 101 may include a first polygon base 103 and a second polygonal base 104. In the view of FIG. 7, the second base 104 is facing downward and is not visible. The filtration module 101 may further include a plurality of corresponding sides 105 through 108. Each of these sides 105-108 may be a planar rectangle disposed perpendicular to the first and second polygonal bases 103, 104. Air flow through the filtration module 101 may pass through the first polygon base 103 into the interior of the filtration module 101 and out of the filtration module 101 through the second polygon base 104, e.g., in the direction of arrow 110. In this regard the direction of flow 110 may be perpendicular to the first and second polygonal bases 103, 104, and parallel to each of the sides 105-108. The distance between the first polygonal base 103 and the second polygonal base 104 may define the thickness 109 of the filtration module 101.

The cross sectional area of the filtration module 101 in a plane perpendicular to the direction of flow 110 is defined by the lengths of the sides 105 through 108 and the angles therebetween. For example, the filtration module 101 is rectangular shaped with sides 105 and 107 being parallel to each other and with sides 106 and 108 being parallel to each other.

The filtration module 101 may be made from a plurality of concentric layers of a filter tape 120 that is spiraled about a central point 113 of the filtration module 101 where, moving from the central point 113 out toward the sides 105-108, each subsequent layer forms a similarly configured, coincidental prism with slightly larger polygonal bases. Such concentric layers may be comprised of a single continuous piece of filter tape 120. In between and parallel to the plurality of layers of the filter tape 120 may be disposed a plurality of spacing layers. The spacing layers may be comprised of a single continuous piece of spacing tape 121. The central point 113 may be positioned at the geometric center of one of the polygonal bases 103, 104 of the filtration module 101 or at a point within the interior of the polygonal bases 103, 104 and offset from the geometric center.

Corresponding corners of each subsequent layer of the filtration module 101 will be disposed along a substantially straight line extending from the central point 113 to a corresponding corner at the perimeter the filtration module 101, such as along a straight line 114 from the central point 113 to a corner 115. The corner angles for each layer along such a line will be substantially similar. Such substantially similar corners may be present regardless of the specific shape of filtration module.

Figure 9:
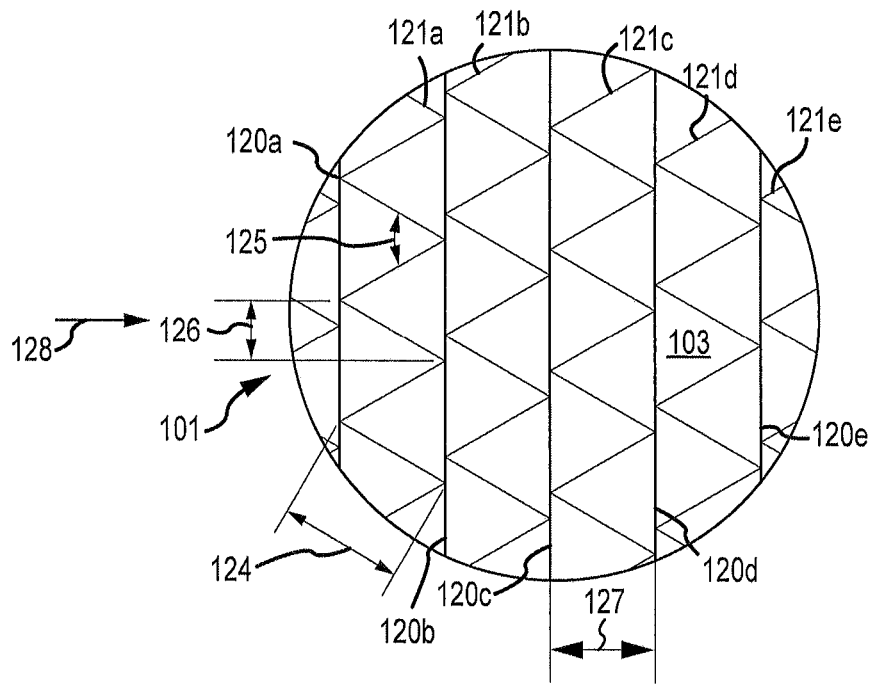
FIG. 9 is an illustration of a portion of the filtration module of FIG. 8.

FIG. 9 is an illustration of the circled portion of the filtration module 101 of FIG. 8. FIG. 9 shows several filter tape layers 120a through 120e with corresponding spacing tape layers 121a through 121d interposed therebetween.

As noted, the filter tape 120 may be a single continuous sheet. An exemplary material for the filter tape 120 is an activated carbon-polytetrafluoroethylene (PTFE)-composite, which may be referred to as a sorbent-polymer-composite (SPC) material with the sorbent being the activated carbon and the polymer being PTFE. The composite may be made in the following way. Activated carbon powder is blended with PTFE powder suspended in an emulsion. The weight percentage of activated carbon to the carbon-PTFE mixture is in the range of 90~20 wt %, and preferably in the range of 80~60 wt %. The blended powders are dried and lubricated with a mineral oil or water/alcohol mixture to form dough. The dough is extruded using a conventional extruder to form an extrudate. The lubricant is then removed from the extrudate by drying and the dried extrudate is then calendared into a sheet form under elevated temperature. The sheet is then stretched at high temperature to develop the microporous structure. When the sheet is stretched, the stretching ratio can be from 0.1 to more than 500%. Usually, the stretching ratio will be from 0.1 to 500%, 1 to 500%, 5 to 500% or 10 to 500%. Further, although it is possible to stretch the sheet in more than one direction (i.e., laterally and longitudinally), it is usually more convenient to stretch the sheet in one direction (here longitudinally). In one embodiment, the sheet shaped product is further laminated with porous PTFE membranes on one or both sides or faces to form a laminated sheet. In another embodiment, the sheet preparation does not include stretching prior to its assembly into the filtration module 101.

Besides PTFE, other fluoropolymer materials suitable for use in the filter tape 120 include, but are not limited to: polyfluoroethylene propylene (PFEP); polyperfluoroacrylate (PPFA); polyvinylidene fluoride (PVDF); a terpolymer of tetrafluoroethylene, hexafluoropropylene and vinylidene fluoride (THV); and polychloro trifluoro ethylene (PCFE); and other copolymers or terpolymers of fluoromonomer/non-fluorinated monomers.

The filter tape 120 may be operable to function in an environment where the temperature is below the temperature necessary to keep sulfuric acid in a liquid phase (below about 100° C.). At such temperatures, the filter tape 120 may not experience any significant temperature related changes to its mechanical properties such as its shape, tension or dimensions. The sulfur oxide and mercury removal aspects of the filter tape 120 are discussed below.

Figure 10:
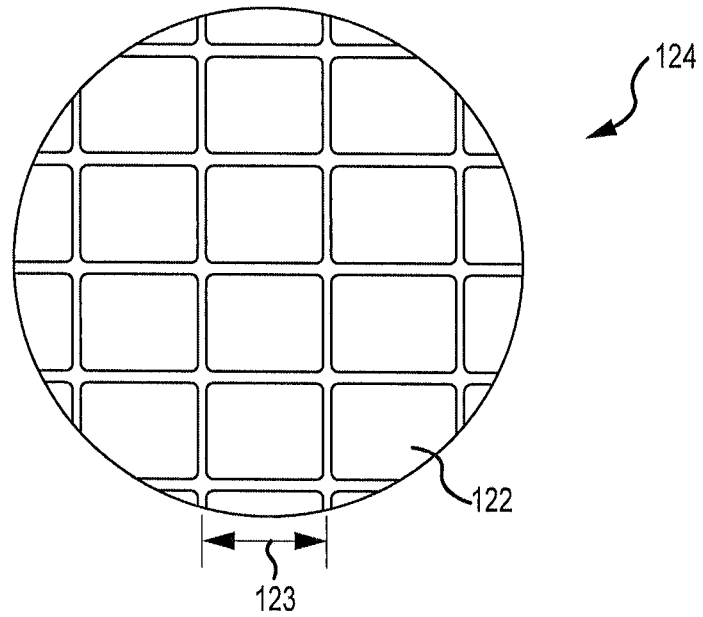
FIG. 10 is an illustration of a portion of a spacing layer of the filtration module of FIG. 8.

A function of the spacing tape 121 is to provide a gap between adjacent layers of the filter tape 120 such that the flow of flue gas may occur between the adjacent layers of the filter tape 120 such that they are exposed to the filter tape 120. The spacing tape 121 may be comprised of a screen 124 (FIG. 10) that is subsequently pleated. FIG. 10 shows a portion of the screen 124 prior to being pleated. The screen 124 may be comprised of a plurality of filaments 122 formed into the screen. For example, all of the filaments 122 oriented in a first direction may be positioned on the same side of all of the filaments 122 oriented in a second direction perpendicular to the first and the filaments 122 may then be bonded to each other to form the screen 124. The bonding may be achieved through elevating the temperature of the filaments 122 such that they fuse together where they cross. A screen pitch 123 is the distance between adjacent parallel filaments 122. The screen pitch 123 and filament 122 diameter may be selected to achieve particular mechanical properties, such as a balance between final mechanical strength of the pleated spacing tape 121 and the pressure drop as gas flows past the spacing tape 121 between the layers of the filter tape 120.

The spacing tape 121 may be made of a material that is operable to withstand exposure to sulfuric acid formed on the filter tape 120 and withstand the temperature of the flu gas passing through the filtration module 101. One exemplary material for the spacing tape 121 is Polyvinylidene Fluoride (PVDF). PVDF is resistant to sulfuric acid, has a melting point of 171° C., which is above the temperatures of the flue gas to which the filtration module 101 will be exposed. Moreover a screen made of PVDF is operable to be pleated to form the spacing tape 121, which is capable of withstanding the desired gas velocities.

The pleating of the spacing tape 121, when assembled into the filtration module 101, may be described as having a final pleating width 126, which is the distance between alternate folds (e.g., every other fold to define a V-shaped pleat), and a final pleating angle 125 that is the angle between the portions of the spacing tape 121 on immediate opposite sides of the fold line of a pleat. A final pleating height 127 is distance between adjacent layers of the filter tape 120, e.g., the thickness defined by the spacing tape 121 after it has been assembled into the filtration module 101. The spacing tape 121 has a resilience to being compressed in the direction 128 perpendicular to the spacing tape 121. Such resilience may help to produce generally evenly sized final pleating thicknesses 127 from layer to layer, as well as additional benefits noted hereinabove.

Supporting structure 102 may restrain the filtration module 101 from expanding or changing its shape from the generally rectangular prism. The supporting structure 102 may be made from a material resistant to damage from sulfuric acid, such as fluoropolymer coated stainless steel. As illustrated in FIG. 7, the supporting structure 102 may be in the form of a wire cage disposed about the filtration module 101. In this regard, the supporting structure 102 may be comprised of six planar screen sections attached to each other to form a cuboid where each face is a rectangle. Where the faces meet each other, they may be fastened together using any appropriate fastening method such as clips, clamps or welds. One or more of the faces may be easily disassembled from the rest of the supporting structure 102 to facilitate the replacement of the filtration module 101 therein.

The supporting structure 102 may be configured to provide the supporting function for the filtration module 101 while also limiting its effects on airflow through the filtration module 101. Accordingly, each of the six planar screen sections may be made up of a plurality of individual wires or rods welded together to form a screen. Other appropriate methods of fixing the individual wires or rods together may be used. The size of the wires and the spacing between the wires may be selected to provide support while limiting their effects on airflow.

Figure 11A:
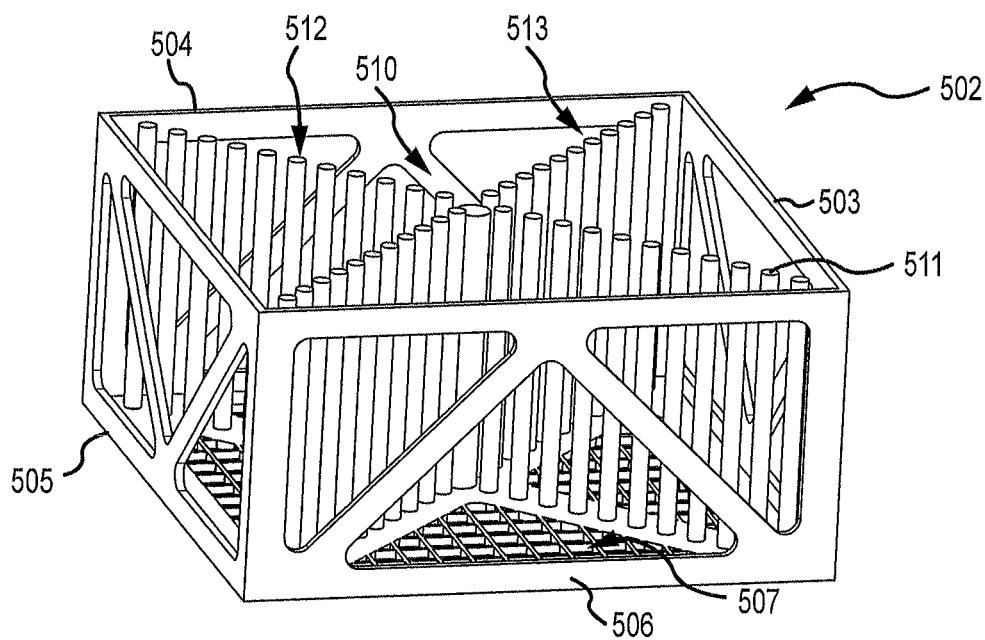
FIG. 11A is an isometric view of a supporting structure for a filtration assembly that includes support combs.
Figure 11B:
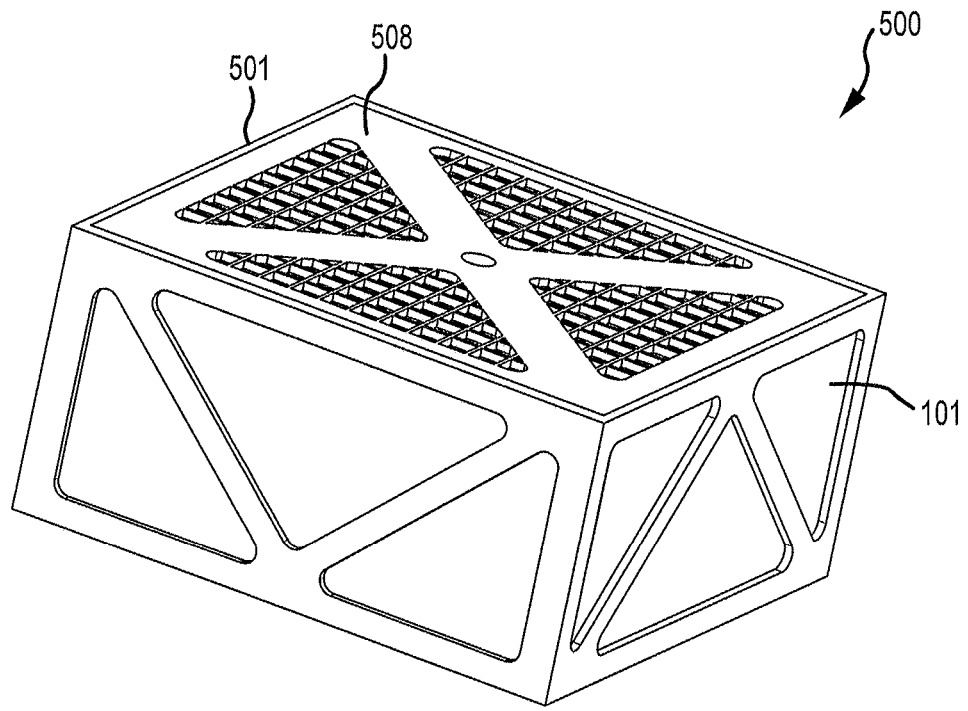
FIG. 11B is an isometric view of a filtration assembly that includes the supporting structure of FIG. 9A.

As illustrated in FIGS. 11A and 11B, in an alternate configuration of a filtration assembly 500, a molded supporting structure 501 may be used to support the filtration module 101. The molded supporting structure of 501 may be made of a plastic material capable of withstanding exposure to sulfuric acid, such as PTFE, FEP, PFA, PVDF, PEEK, PVC, CPVC, PP, or reinforced plastic made with epoxy vinyl ester resins. The molded supporting structure of 501 may be constructed in any appropriate fashion. For example, the molded supporting structure 501 may be assembled by assembling six individual panels 503-508 each of which forms one of the faces of the supporting molded supporting structure 501. The individual panels 503-508 may be interconnected to each other in any appropriate manner, such as snaps, fasteners, clips or welds. In an embodiment, the base portion 502 may be a single unitary molded member.

As illustrated in FIG. 11A, a base portion 502 of the molded supporting structure 501 may be assembled by interconnecting a first face 507 and four side panels 503-506. In an embodiment, these panels may be permanently interconnected to each other (e.g., using one-way snaps, or rivets). A second face 508 may be attached to the base portion 502 in such a way that the second face 508 may be repeatedly removed from and replaced onto the filtration assembly 500, thus enabling the filtration module 101 to be repeatedly replaced.

Any embodiment of a filtration assembly 100 described herein may include one or more combs 510. The combs 510 may be comprised of a plurality of evenly spaced teeth 511 such that when the combs 510 are assembled into the filtration assembly 100, each tooth 511 of the combs 510 is disposed at a corner of each concentric prism formed by the spiraling of the filter tape 120. Thus the combs 510 may operate to maintain an even spacing between subsequent layers of the filter tape 120.

The combs 510 may be made of any appropriate material and configured in any appropriate manner. For example, as illustrated in FIG. 11A, the combs 510 may be of the same material as the molded supporting structure 501. The combs 510 may be part of the first face 507 in that the combs 510 and the first face 507 may be a single unitary component (i.e. a single molded piece). In another alternate embodiment, the combs 510 may be separately molded from and then attached to the first face 507. For example, the illustrated in FIG. 11A may be constructed from two separate portions 512, 513 that are each in the form of a plurality of teeth 511 arranged along a straight line. These two separate portions 512, 513 may then be attached to the first face 507 to form the structure illustrated in FIG. 11A. In another alternative embodiment, the combs 510 may be made up of four or more separate portions that are each then attached to the first face 507. Alternatively, each individual tooth 511 may be separately manufactured and inserted into the first face 507 and fastened thereto using any appropriate means (e.g., welding, adhesive, press fit). In another example, the combs 510 may be made of plastic polymers such as PTFE, FEP, PFA, PVDF, PEEK, PVC, CPVC, PP, or fiberglass reinforced plastic made with epoxy vinyl ester resins.

In alternative embodiments the combs 510 may be stand alone components that may be inserted into the filtration module 101 without being affixed to the molded supporting structure 501. Such combs 510 may also be used in the filtration assembly 100 shown in FIG. 1. In such embodiments, the combs 510 may be inserted into the filtration module 101 prior to the filtration module 101 being closed within the supporting structure 102 or molded supporting structure 501.

Figure 12:
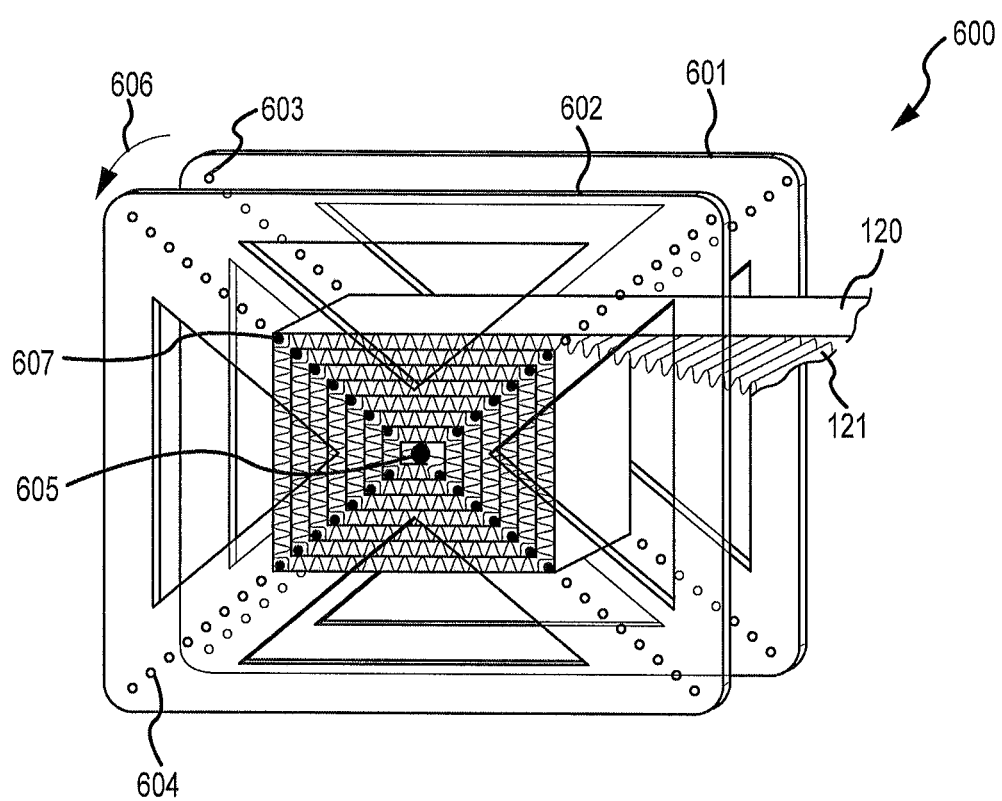
FIG. 12 is an isometric view of a filtration module assembly device with a partially formed filtration module thereon.

Turning to FIG. 12, an exemplary method of manufacturing the filtration assembly 100 of FIG. 1 will now be described. The method will be described in terms of manual construction. However, automation of these steps is contemplated. The method uses a construction fixture 600 that includes a first plate 601 and a second plate 602 arranged parallel to each other and separated by a slightly larger than the width of the filter tape 120. The first plate 601 may include a plurality of holes 603 that are positioned such that they will be located at what will be the position of each corner of each layer of the filtration module 101 to be assembled. The second plate 602 contains a similarly positioned plurality of holes 604. A centrally located rod 605 is positioned at what will be the center of the spiraling layers of the filtration module 101. The rod 605 may include a slot therein in which an end the filter tape 120 and an end of the spacing tape 121 are inserted at the beginning of the assembly process, thus anchoring the ends of the filter tape 120 and spacing tape 121 to the rod 605.

Next, as illustrated in FIG. 12, the construction fixture 600 is rotated in a counterclockwise direction 606 resulting in the filter tape 120 and spacing tape 121 being wound about the rod 605. As the construction fixture 600 is rotated, a plurality of pins 607 are sequentially inserted into corresponding holes in the first and second plates 601, 602 such that one of the pins 607 is disposed between each subsequent layer of the filter tape 120 and spacing tape 121 as the filter tape 120 and spacing tape 121 are wound about the rod 605. Such winding creates the plurality of concentric layers of the filtration module 101. The filter tape 120 and spacing tape 121 will be disposed such that they form relatively straight sections between subsequent pins 607. Accordingly, upon the completion of each layer, another similarly configured, coincidental prism will be formed, and it will have a slightly larger polygonal base than the immediately preceding prism. Moreover, the pins 607 will define the positions of the corners of the layers of the filtration module 101 and each subsequently formed corner will be of substantially the same angle as the corresponding corner of the adjacent layer. Thus, if the plurality of holes 603,604 are arranged in an "X" pattern where the lines of the "X" are at right angles to each other as shown in FIG. 6, the subsequently formed filtration module 101 will be generally square. It will be appreciated that by varying the angle between the lines of the "X," rectangular shaped filtration modules may be formed.

During the construction process, tension may be maintained on the filter tape 120 and/or the spacing tape 121. The tension maintained on each component may be different. For example, the tension maintained on the filter tape 120 during the winding process may be selected such that each planar portion of the filter tape 120 in the final filtration module 101 maintains a generally planar configuration (e.g., little or no slack is present).

Moreover, the tension maintained on the spacing tape 121 during the winding process may be selected such that a particular final pleating thickness 127 is achieved. In this regard, the pleating of the spacing layer 121 may have a natural, or untensioned, state where the natural pleating pitch (the distance from a fold line of a pleat to the next fold line along the direction of the spacing layer 121 when no tension is placed on the spacing layer 121) is less than the desired final pleating pitch 126. It will be appreciated that by placing tension on the spacing tape 121, the pleating pitch may be increased, which will be accompanied by a corresponding decrease in pleating thickness as the angle between adjacent pleats is increased.

The desired tensions of the filter tape 120 and spacing tape 121 as they are wound about the rod 605 may be achieved in any appropriate manner. For example, the filter tape 120 and spacing tape 121 may be fed from individual rolls of materials mounted on spindles capable of maintaining a particular desired tension as the materials are fed into the construction fixture 600.

Once the desired size of the filtration module 101 is achieved, the filter tape 120 and spacing tape 121 may be cut and the ends of the filter tape 120 and spacing tape 121 may be secured to the layer of filter tape 120 immediately adjacent to the ends. Such securing may be achieved in any appropriate manner including by taping, crimping, or clamping the layers together. The securing need not be permanent, as once the filtration module 101 is disposed within the supporting structure 102, the filtration module 101 will generally retain its shape and not unwind.

After securing the ends of the filter tape 120 and the spacing tape 121, the filtration module 101 may be inserted into a portion of the supporting structure 102 (e.g., a portion of the supporting structure 102 that includes four sides and one of the faces parallel to a base of the filtration modules, similar to the base portion 502 of the molded supporting structure 501 shown in FIG. 11A), For example, to accomplish this, the first plate 601 may be removed from the construction fixture 600, and the portion of the supporting structure 102 may be positioned around the filtration module 101 while the filtration module 101 is still on the construction fixture 600. The pins 607 may then be pulled from the construction fixture 600/filtration module 101 and the portion of supporting structure 102 may be removed from the construction fixture 600 with the filtration module 101 disposed therein. The rod 605 may also be pulled from the construction fixture. The supporting structure 102 may then be completed by attaching the remaining portion of the supporting structure (e.g., the other face parallel to the base of the filtration module 101) thus completely surrounding the filtration module 101 within the supporting structure 102. Where the filtration module 500 is being assembled, a similar procedure may be used to position the filtration module within the base portion 502.

Other assembly variations may be utilized. For example, the first and second plates 601, 602 may remain attached to the construction fixture 600 throughout the assembly process. In such a method, after the filtration module 101 is made, four sides of the supporting structure 102 or molded supporting structure 501 may be assembled about the filtration module 101. The pins 607 may be removed and the filtration module with the four sides of the supporting structure 102 or molded supporting structure 501 may be slid out from between the first and second plates 601, 602. Then the bases of the supporting structure 102 or molded supporting structure 501 may be attached, thus completely surrounding the filtration module 101.

In filtration modules that use combs 510, the combs may be assembled into the filtration module in any appropriate manner at any appropriate point in the assembly process. For example, after the filtration module 101 is completed and the first plate 601 has been removed from the construction fixture 600, the combs 510 may be inserted into the filtration module before the pins 607 are removed. In a variation, the combs 510 may be inserted as the pins 607 are removed. In this regard, the teeth 511 of the combs 510 may be aligned with the pins 607 such that as the combs 510 are pushed into the filtration module 101, the pins 607 are pushed out, so that the teeth 511 effectively take the place of the pins 607. In another variation, the combs 510 may be inserted into the filtration module 101 after the pins 607 are removed. The combs 510 may be used in any appropriate filtration assembly, including the filtration assembly 100 with the supporting structure 102.

SOx Removal

As previously noted, the filter tape 120 may comprise a sorbent-polymer-composite (SPC). The SPC material may be operable to remove SOx from gas, such as flue gas, passing through the filtration assembly by adsorption. In such an adsorbent-based process, the flue gas is forced to flow through the filtration module, which may be referred to as an adsorbent bed, and the SOx molecules are adsorbed on the adsorbent surfaces of the sorbent materials. When adsorbed, SO2 is converted into SO3, and it is further converted into sulfuric acid (H2SO4) with water vapor from the flue gas. The converted sulfuric acid, which may be in a relatively concentrated solution form, will be expelled from the SPC matrix onto the external surfaces of the SPC material, and can be collected. We refer to the acid solution expelling phenomenon as the "reverse sponge" since it is just opposite to a sponge which tends to absorb solution into its pores whenever it is contacted with a solution.

The sulfuric acid is expelled onto the external surfaces of the SPC material and coalesces into droplets. When those droplets become large enough, they fall downwards along the external surface of the SPC material (e.g., along the filter tape 120), coalescing with other droplets and thereby creating some open surfaces where new droplets may form.

Mercury Vapor Removal

As mercury vapor passes through the filtration assembly 100, the mercury vapor is fixed into the SPC material by adsorption. That is, the activated carbon can adsorb mercury vapor. Further, by modifying activated carbon with sulfur, sulfur compounds, or other chemical compounds, the holding capacity of the SPC material for mercury can be significantly increased. Also, since the sulfuric acid discussed above is continuously expelled from the microporous matrix, no regeneration step is required to remove sulfur.

The filtration assembly 100 may be disassembled. With respect to mercury adsorbed by the SPC material, the mercury may be removed using a retort process. The relatively high absolute vapor pressure at moderately elevated temperatures enables mercury to be removed by retorting or vacuum distillation. Mercury retort systems can operate within the vacuum range of 0.2-1.0 torr and temperature range of 190° C. to 260° C. After volatilizing the mercury, it can be condensed for recovery and may be purified by subsequent distillation. The spacer member 121 may be cleaned and reused for construction of new modules.

As noted above, droplets of H2SO4 may be formed on the external surfaces of the SPC material of the filter tape 120. Upon reaching a certain size, these droplets will fall due to gravity. Accordingly, the filtration assembly 100 may be operated such that the planes of the filter tape 120 are vertically oriented or oriented at an angle relative to vertical that allows the droplets to flow out of the filtration assembly. In this regard, the droplets will fall down and out of the filtration assembly 100 where they may be collected.

Figure 13A:
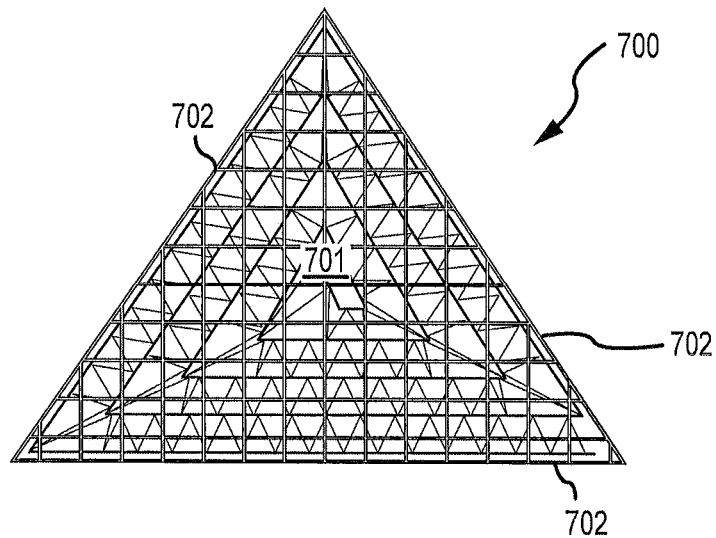
FIGS. 13A and 13B are isometric views of alternatively configured filtration modules.
Figure 13B:
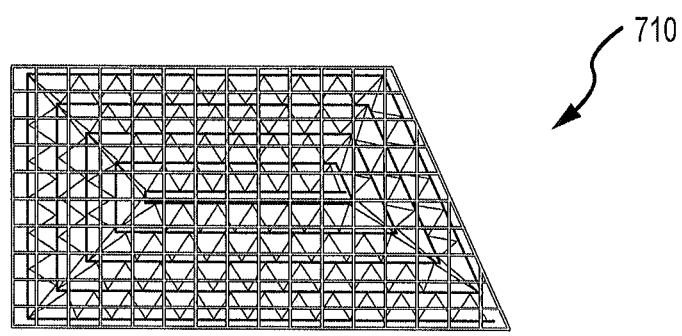
Figure 14:
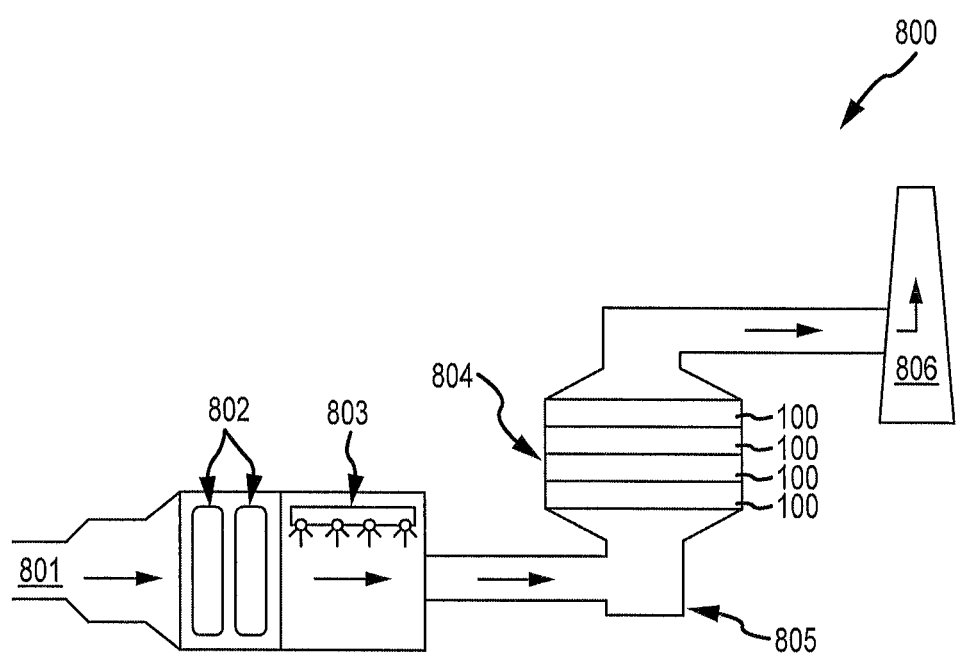
FIG. 14 is a schematic illustration of a flue gas cleaning process.

The bases of the filtration assembly 100 of FIGS. 7 and 8 are generally rectangular. Other shapes are also possible. For example, as shown in FIG. 13A, a filtration assembly 700 may be in the form of a triangular prism, where the bases 701 are each triangular and the filtration assembly 700 includes three side panels 702. Such a filtration assembly 700 would be assembled in an appropriately configured construction fixture. As shown in FIG. 13B, the shape of a filtration assembly 710 need not be symmetric or contain uniform angles. Moreover, other embodiments of filtration assemblies may have more than 4 sides. Filtration assemblies may be shaped to fit particular applications (e.g., existing duct work for flue gasses to be filtered).

Multiple filtration modules may be assembled into a single filtration assembly to achieve desired filtration assembly shapes. For example, an "L" shaped filtration assembly could be manufactured by joining two rectangular filtration modules in a single supporting structure.

Filtration Assembly Example

Filtration assemblies were constructed with an overall size (i.e., the outer dimensions of the supporting structure) of 26 inches by 26 inches by 7 inches thick. The filtration modules were oriented within the supporting structures such that airflow passed through the thicknesses of the assemblies (e.g., as shown in FIG. 1). The supporting structure was constructed from 316 stainless steel. The wire gauge for the supporting structure was 16 ga and the wires were spaced between about 0.44 and 0.94 inches apart.

For each filtration assembly, the filtration module therein measured about 25.75 inches by 25.75 inches by 6.75 inches thick. The filter tape and spacing tape widths were each about 6 and 6.75 inches respectively. The filter tape was about 0.02 inches thick. The spacing tape comprised 0.007 inch diameter filaments arranged in a grid where the filaments were spaced about 0.050 inches apart. The spacing tape was pleated such that the pleating width was between 0.20 and 0.35 inches. A preferred pleating height is between about 0.28 and 0.35 inches. During assembly, tension was maintained in the spacing tape such that the adjacent pleats generally formed equilateral triangles with proximate portions of the filter tape. Thus, the final pleating angle 125 was about 60°, and the final distance between successive layers of filter tape was about 0.27 inches. The pressure drop across each filtration module was measured to be about 0.1 in. w.g.

Application Example 1

An exemplary system 800 arrangement using filtration assemblies 100 is shown in FIG. 8. Flue gas 801 from a combustor is reduced in temperature by heat exchangers and is then introduced into an electrostatic precipitator (ESP) or bag house 802. After the ESP or bag house 802, the flue gas is further reduced in temperature by water spray 803. The water spray 803 will increase the flue gas humidity as well. After the water spray step, the flue gas is introduced into the SPC sorbent house 804, which includes four filtration assemblies 100, where SO2 and SO3 are converted into sulfuric acid solution and expelled onto the SPC external surfaces; the mercury vapor is chemically adsorbed on the sorbent material; and fine particles are trapped either on the surface of the SPC material or on the surface of porous PTFE membranes that may be laminated on the surfaces or faces of the sheets of SPC material. The expelled sulfuric acid is collected by will dripping down to the acid reservoir 805 together with trapped fine particles. Finally, the cleaned flue gas exits from the sorbent house to the stack 806.

Such a system 800 has several advantages over existing activated carbon injection systems where activated carbon particles are injected in the flue gas to remove pollutants. In such existing systems, if the activated carbon is injected into the flue gas upstream of the bag house, the fly ash filtered by the bag house will be contaminated with mercury. If the activated carbon is injected into the flue gas downstream of the bag house, a second bag house is needed to filter the activated carbon particles. With the system 800, the material filtered by the bag house 802 is uncontaminated and may be sold or recycled without having to perform decontamination. Moreover, in applications using a Flue Gas Desulfurization (FGD) wet scrubber, the sorbent house 804 may be located downstream of the FGD wet scrubber.

Application Example 2

An exemplary cement kiln may require about 500,000 cfm of flue gas to be filtered. Such a flow may be filtered by a plurality of filtration assemblies as described above in the filtration assembly example, except that each filtration assembly would be 13 inches thick (being constructed from 12 inch wide filter and 12.5 inch spacing tape) instead of the described 7 inches thick. The filtration assemblies may be arranged into a plurality of stacks, with each stack comprising four serially arranged (e.g., like a stack of pancakes) filtration assemblies. Each stack may be capable of filtering about 1,000 cfm of flue gasses. Thus, in order to filter the 500,000 cfm of flue gas, about 500 such stacks would be required.

The filtration assemblies described herein may be used in a variety of filtering applications. For example, such filtration assemblies may be used to remove mercury and/or SOx from flue gases such as those from cement kilns, coal and oil fired power generation plants, industrial boilers, municipal waste incinerators, and oil refinery plants. Additional applications will be apparent to those skilled in the art. Additional modifications and extensions to the embodiments described herein will be apparent to those skilled in the art. Such applications, modifications and extensions are intended to be within the scope of the present invention as defined by the claims that follow.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A filtration module, comprising:
    a filter member; and
    a spacing member, said filter member and said spacing member being disposed in detached, contact engagement along a length of each said member to define a predetermined configuration of the filtration module, said spacing member being preformed to include a plurality of undulations extending across a width thereof and along said length thereof;
    wherein said length of said filter member and said length of said spacing member each extend about a longitudinal axis of the filtration module to define a concentric and detached plurality of filtration layers, and an interleaved, concentric and detached plurality of spacing layers, respectively;
    wherein corresponding portions of at least some of said plurality of undulations are configured across a portion of said width, between opposite edges of the spacing member, to define notched portions,
    wherein said filter member is located within said notched portions; and
    wherein the notched portions of the spacing member define a plurality of channel portions along the interleaved, concentric and detached plurality of spacing layers; and
    wherein at least portions of adjacent filtration layers are located therewithin.

2. The filtration module as claimed in claim 1, wherein said plurality of spacing layers apply a radially-inward directed force to at least one or more of said plurality of filtration layers.

3. The filtration module as claimed in claim 2, wherein said spacing member is elastically deformed in said filtration module.

4. The filtration module as claimed in claim 2, wherein said spacing member is elastically deformed between adjacent ones of said plurality of filtration layers, along at least a portion of said length of the spacing member.

5. The filtration module as claimed in claim 4, wherein each of said plurality of spacing layers applies a radially-inward directed force and a radially-outward directed force to different adjacent ones of said plurality of filtration layers.

6. The filtration module as claimed in claim 4, wherein said spacing member is preformed to have a preassembly undulating configuration, and wherein said spacing member is elastically deformed to an assembled undulating configuration in said filtration module.

7. The filtration module as claimed in claim 6, wherein said spacing member is pleated to define a plurality of pleats extending across a width thereof along said length thereof, wherein each of said plurality of pleats extends in a direction coincidental with said longitudinal axis of said filtration module.

8. The filtration module as claimed in claim 7, wherein each of said plurality of pleats defines an open channel extending in a direction coincidental with said longitudinal axis from a first end of said filtration module to a second end of said filtration module.

9. The filtration module as claimed in claim 7, wherein said spacing member comprises openings therethrough, across the width and along the length thereof.

10. The filtration module as claimed in claim 9, wherein said spacing member comprises a screen defined by filaments arranged in a crisscross pattern.

11. The filtration module as claimed in claim 2, further comprising:
    a retaining member located to engage an external side surface portion of the filtration module,
    wherein said plurality of filtration layers and said plurality of spacing layers are maintained in substantially fixed relation to one another.

12. The filtration module as claimed in claim 11, wherein said spacing member is elastically deformed in said filtration module.

13. The filtration module as claimed in claim 1, wherein said spacing member has a melting temperature of at least about 60° C.

14. The filtration module as claimed in claim 1, wherein said spacing member is resistant to sulfuric acid.

15. The filtration module as claimed in claim 1, wherein said spacing member comprises at least one material of a group comprising:
   polytetrafluoroethylene;
   polyfluoroethylene propylene;
   polyperfluoroacrylate;
   polyvinyidene fluoride;
   polyether ether ketone;
   polyvinyl chloride;
   chlorinated polyvinyl chloride; and,
   polypropylene.

16. The filtration module as claimed in claim 1, wherein a width of said filter member and a width of said spacing member are substantially equal.

17. The filtration module as claimed in claim 1, said spacing member being preformed to have an undulating configuration that includes a plurality of undulations extending across a width thereof along said length thereof~wherein corresponding portions of at least some of said plurality of undulations are notched across a portion of said width, between opposite edges of the spacing member, to define notched portions, and wherein said filter member is located within said notched portions.

18. The filtration module as claimed in claim 1, wherein said predetermined configuration is a prism.

19. The filtration module as claimed in claim 1, wherein said predetermined configuration is a cylinder.

20. The filter assembly comprising the filtration module of claim 1, further comprising:
   a holder for supporting the filtration module.

21. The filter assembly as claimed in claim 20, said holder comprising:
   a ring portion defining an opening for receiving the filtration module therewithin, wherein the ring portion is of a configuration that coincides with the predetermined configuration of the filtration module.

22. The filter assembly as claimed in claim 21, further comprising:
   an open-cell carrier for selectively receiving the filtration module there within, wherein the carrier is selectively positionable within the opening and supportably engageable with the holder.

23. The filter assembly as claimed in claim 22, said open-cell carrier comprising:
   a bag member for selectively receiving the filtration module therewithin; and,
   a ring member for positioning over and about said ring portion of the holder, wherein the bag member is supportably suspended in the opening.

24. A method of constructing the filtration module of claim 1, said method comprising:
   providing a filter member and a spacing member;
   positioning a length of each of the filter member and spacing member about a longitudinal axis to define a concentric, detached plurality of filtration layers and an interleaved, concentric and detached plurality of concentric spacing layers, respectively, wherein said filter member and said spacing member are disposed in detached, contact engagement along said length of each said member;
   retaining said plurality of filtration layers and said plurality of spacing layers in substantially fixed relation to one another; and
   locating said filter member within each said notched portions.

25. The method as claimed in Claim 24, further comprising:
   maintaining tension on at least one of said spacing member and said filter member, during at least a portion of said positioning step.

26. The method as claimed in claim 25, said maintaining step comprising;
   applying a force to said spacing member.

27. The method as claimed in claim 24, wherein said spacing member is elastically deformable, said method further comprising:
   elastically deforming at least a portion of said spacing member in response to said applying step, wherein at least a portion of said elastic deformation is maintained during said retaining step.

28. The method as claimed in claim 24, said positioning step comprising:
   wrapping said filter member and said spacing member in tandem about said longitudinal axis.

29. The method as claimed in claim 28, said wrapping step comprising:
   anchoring inner ends of said filter member and said spacing member to a post member; and,
   rotating said post member to wind said filter member and said spacing member about said post member.

30. The method as claimed in claim 29, further comprising:
   maintaining tension on at least one of said spacing member and said filter member during at least a portion of said positioning step.

31. The method as claimed in claim 30, said maintaining step comprising:
   applying a force to said spacing member.

32. The method as claimed in claim 31, wherein said spacing member is elastically deformable, said method further comprising:
   elastically deforming at least a portion of said spacing member in response to said applying step, wherein at least a portion of said elastic deformation is maintained during said retaining step.

33. The method as claimed in claim 24, said maintaining step comprising:
   locating a retaining member to restrainably engage an external side surface portion of the filtration module.

34. The method as claimed in claim 33, said maintaining step comprises:
   maintaining outer ends of said filter member and said spacing member at corresponding, substantially fixed distances from said longitudinal axis.

35. The method as claimed in claim 33, said maintaining step comprising:
   interconnecting an exposed annular surface portion of a layer of one of said filter member and spacing member to an exposed annular surface portion of another layer of said one of said filter member and said spacing member.

36. The method as claimed in claim 24, wherein said filtration module may be utilized in an assembly, further comprising:
   locating said filtration module within an opening of a holder, wherein said filtration module is supported by said holder.

37. The method as claimed in claim 36, wherein said opening is defined by a ring portion of said holder and has a configuration that coincides with a predetermined configuration of said filtration module.

38. The method as claimed in claim 24, said positioning step comprising:

providing a support having a first plurality of N pins extending therefrom and defining a polygonal configuration, wherein N>3;
wrapping said filter member about the first plurality of pins to form a first filtration layer;
providing a second plurality of N pins extending from the support and defining a coincidental, polygonal configuration, wherein N>3; and,
winding said spacing member about said second plurality of N pins to form a first spacing layer.

39. The method as claimed in claim 38, further comprising:
inserting another plurality of N pins into the support to define a coincidental, polygonal configuration;
wrapping the filter member about the another plurality of N pins to form another filtration layer;
inserting an additional plurality of N pins into the support to defining a coincidental, polygonal configuration; and,
winding the spacing member about the additional plurality of N pins to form another spacing layer.

* * * * *